(12) United States Patent
Krishna et al.

(10) Patent No.: US 7,155,702 B2
(45) Date of Patent: Dec. 26, 2006

(54) INTERFACE AND STUB GENERATION FOR CODE DISTRIBUTION AND SYNTHESIS

(75) Inventors: Ksheerabdhi Krishna, Cedar Park, TX (US); Michael Montgomery, Cedar Park, TX (US)

(73) Assignee: Axalto SA, Montrouge (FR)

( * ) Notice: Subject to any disclaimer, the term of this patent is extended or adjusted under 35 U.S.C. 154(b) by 307 days.

(21) Appl. No.: 09/951,761

(22) Filed: Sep. 13, 2001

(65) Prior Publication Data

US 2003/0051233 A1    Mar. 13, 2003

(51) Int. Cl.
*G06F 9/45* (2006.01)
(52) U.S. Cl. ............... 717/108; 717/140; 717/164
(58) Field of Classification Search .......... 717/108, 717/137, 140, 164; 719/315, 328
See application file for complete search history.

(56) References Cited

U.S. PATENT DOCUMENTS

| | | | | |
|---|---|---|---|---|
| 5,675,805 A | * | 10/1997 | Boldo et al. | 717/114 |
| 5,778,228 A | * | 7/1998 | Wei | 719/328 |
| 5,860,072 A | * | 1/1999 | Schofield | 707/101 |
| 5,943,674 A | * | 8/1999 | Schofield | 707/104.1 |
| 5,987,247 A | * | 11/1999 | Lau | 717/100 |
| 6,016,489 A | * | 1/2000 | Cavanaugh et al. | 707/8 |
| 6,032,198 A | * | 2/2000 | Fujii et al. | 719/328 |
| 6,066,181 A | * | 5/2000 | DeMaster | 717/148 |
| 6,074,432 A | * | 6/2000 | Guccione | 717/108 |
| 6,308,317 B1 | * | 10/2001 | Wilkinson et al. | 717/139 |
| 6,880,155 B1 | * | 4/2005 | Schwabe et al. | 717/162 |
| 2002/0082847 A1 | * | 6/2002 | Vandewalle et al. | 705/1 |
| 2002/0083142 A1 | * | 6/2002 | Lagosanto et al. | 709/207 |

OTHER PUBLICATIONS

Zhiqun Chen, "Java Card Technology for Smart Cards", Jun. 2000, Addison Wesley, ISBN 0-201-70329-7, Section 3.3.*
"Orbix Programmer's Guide: Java Edition", Sep. 2000, Orbix Technologies PLC, Chapter 5 and 6.*
Zhiqun Chen, "Java Card™ Technology for Smart Cards", Jun. 9, 2000, Addison Wesley, ISBN: 0-201-70329-7, Section 3.9, 4 pages.*
Krishna et al., A Simple(r) Interface Distribution Mechanism for Java Card, Java on Smart Cards; Programming and Security, Revised Papers, First International Workshop, Java Card 2000, Sep. 14, 2000, p. 114 ff (7 pages), Springer-Verlag, LNCS 2041, Cannes, France.
Chapter 5, Java Card 2.1.1 Virtual Machine Specification, May 18, 2000, pp. 47-63.

* cited by examiner

*Primary Examiner*—Tuan Dam
*Assistant Examiner*—J. Derek Rutten
(74) *Attorney, Agent, or Firm*—Pehr Jansson; Anderson & Jansson, L.L.P.

(57) ABSTRACT

A first software program is capable of being referenced by a second software program. For compiling the second program, information, including an interface definition, is generated by a converter for the first program. Also, a generator is provided for generating first source code from the interface definition, so that second source code may be developed and the second program may be compiled from the first and second source code.

48 Claims, 9 Drawing Sheets

```
701  Parse arguments {
702  IDE file path = Set of directories indicating location of IDE files
703  jar file name = Name of jar file to be generated (containing
     synthesized classes)
704  IDE file name [optional] = IDE file from which to synthesize
     classes/jar file
705  }
706
707  For each IDE file to be parsed {
708  Parse IDE file and extract package name
709  For each class that belongs to the IDE file {
710  Initialize import list
711  Set the super class of the class in accordance with the super class
     info in the IDE file
712  For each field belonging to the class whose access_flag does not
     set ACC_INHERITED {
713  Create the field with the right signature and access condition
714  Process attributes {
715  If the field has a ConstantValue attribute {
716  Read the constant value and store it in the field
717  }
718   Update import list if field type refers to a class not in this package
719  }
```

FIG. 7A

```
720  For each method belonging to the class whose access_flag does not set
     ACC_INHERITED {
721  Create the method header with the right signature and access condition
722  If method name begins with <init> (a constructor method) {
723  Set name to correspond to the class name
724  Set return type to null
725  }
726  If the method returns a reference
727  Set the return value to null
728  Else
729  Set the return value to 0 cast appropriately to match the method's return type
730  Process attributes {
731  If the method has an Exceptions attribute {
732  Read the fields attribute and Store the throws clause(s)
733  }
734  }
735  Update import list if method return or argument type refers to class not
     in this package
736  }
737  Synthesize class file {
738  Create a source file named <classname>.java in the appropriate directory
739  Append package statement
740  Append the imports list
741  Append the class/interface statement with superclass/superinterface list
742  Append field declarations
743  Append method stubs
744  Compile the generated source
745  }
746  }
747  Place the synthesized class files in a Jar file
748  }
```

INTERFACE AND STUB GENERATION FOR CODE DISTRIBUTION AND SYNTHESIS

CROSS-REFERENCE TO RELATED APPLICATION

This application is related to the following application, which is hereby incorporated herein by reference: Wilkerson et al., "Using a High Level Programming Language with a Microcontroller," application Ser. No. 08/957,512, filed Oct. 24, 1997, provisional application No. 60/029,057, filed Oct. 25, 1996.

This application is related to the following application, which is hereby incorporated herein by reference: Wilkinson et al., "Using a High Level Programming Language with a Microcontroller," U.S. Pat. No. 6,308,317, issued Oct. 23, 2001.

BACKGROUND

1. Field of the Invention

This invention concerns programs for interpreting on smart cards and to which others want to interface, and more particularly concerns distribution of such programs.

2. Related Art

To develop a program for running on a Java Card smart card, a developer uses a standard Java development environment. First the developer writes a set of source code files, from which is compiled a standard Java program, that is, a set of binary class files constituting a package. Then the developer runs a special program called a Java Card smart card converter that converts the package into a loading unit known as a converted applet file ("CAP").

If a second developer wants to create an applet that uses services of the first developer's applet, the first developer provides the source code version of the first applet to the second developer. One issue with this development process concerns protection of the first developer's intellectual property. That is, secrecy of the first developer's source code is jeopardized by distributing it to secondary developers. Another issue with the process that is specific to executables for resource constrained devices such as Java Cards concerns size of the executables. Memory on a Java Card smart card is limited. Therefore executables for Java Cards smart cards must not only include the above described linking elements, but they also must be rather small.

Certain problems or limitations concerning distribution of, linking against or execution of the first developer's library or applets are addressed in the above cross-referenced, related application. However, a further need exists for improvements in distributing information about Java Card software developed by one party (the "originator" or "primary developer") to others who want to develop related programs ("secondary developers"). In particular, there is a need for improvements in distributing information that permits secondary developers' programs to interface with the originator's program.

DETAILED DESCRIPTION OF PREFERRED EMBODIMENT

The claims at the end of this application set out novel features which applicants believe are characteristic of the invention. The invention, a preferred mode of use and advantages will best be understood by reference to the following detailed description of an illustrative embodiment read in conjunction with the accompanying drawings.

Figure 1:
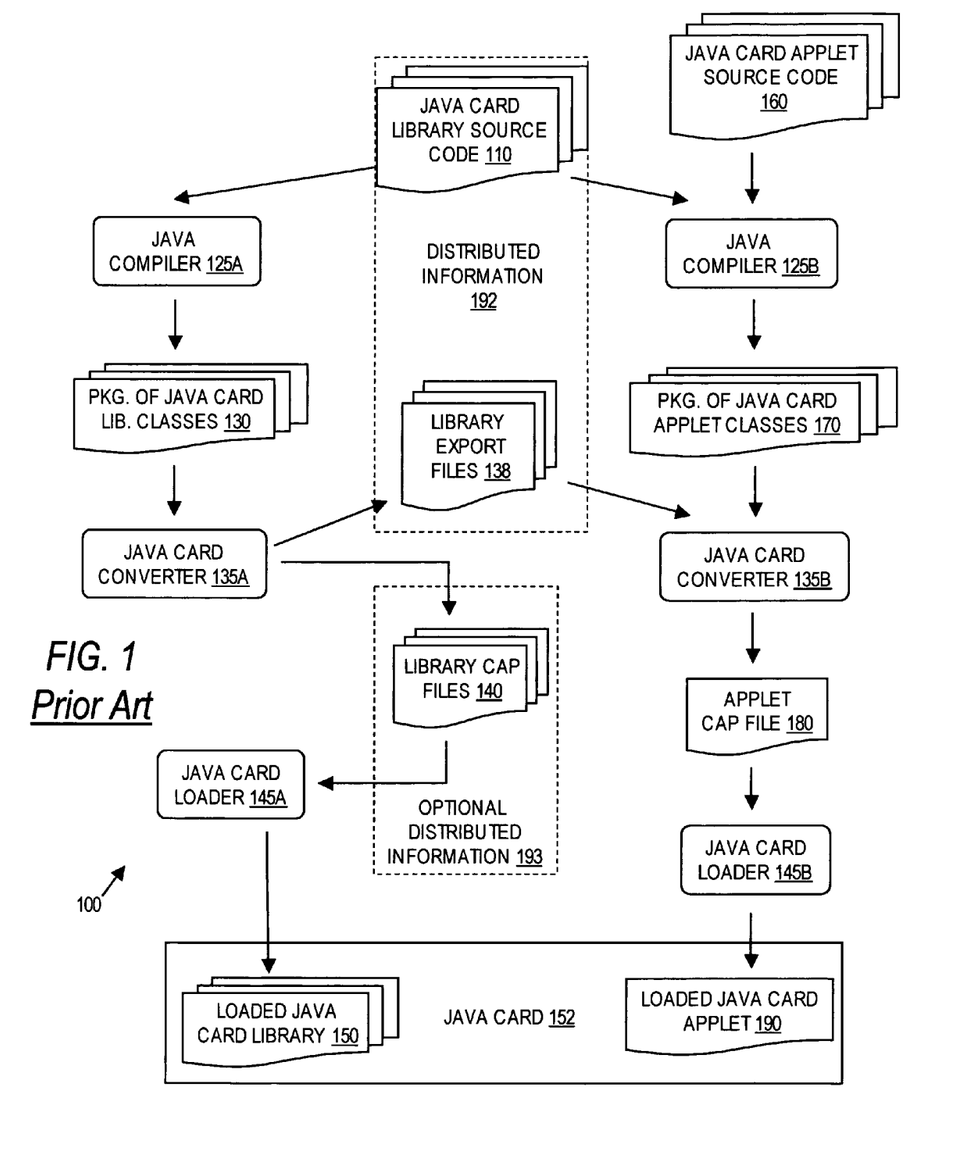
FIG. 1 shows aspects of a Java Card application development process 100.

FIG. 1 shows a Java Card application development process 100. According to this process, a first developer writes a Java Card library source code 110, and compiles the library 110, using Java Card compiler 125A, into a package of Java Card library classes 130. If this was a conventional Java application, rather than a Java Card application, the package of classes 130 would be suitable for dynamic loading and instantiation in a running Java interpreter without the necessity of further processing external to the Java Card smart card 152 prior to interpretation by a Java virtual machine (not shown) on Java Card smart card 152. But Java Cards smart cards currently do not support such dynamic loading of classes. Therefore, in order to be suitable for interpretation by the Java virtual machine, a Java Card executable must include all elements necessary for on-card interpretation, such as cross references to code outside the executable itself. In order to incorporate these elements, packages of Java Card library classes 130 are transformed by Java Card converter 135A into a library of converted applet ("CAP") files 140. These CAP files 140 are processed by Java Card loader 145A to generate a loadable Java Card library 150.

According to the process 100, if a second developer wants to create an applet 190 that will use services of the library 150 on the Java Card smart card 152, the first developer provides the source code version 110 of the library 150 to the second developer. The second developer then writes a source code Java Card applet 160 with references to the library 110, and processes the applet 160 and the library 110 with a Java compiler 125B to compile a binary code package of Java Card applet classes 170. The package of Java Card applet classes 170 is transformed by Java Card converter 135B using information in library export file 138, resulting in applet CAP file 180. This CAP file 180 is then processed by Java Card loader 145B to generate a loadable Java Card applet 190 for execution on the Java Card smart card 152.

The sizes of the files 140 and 150 are reduced by Java Card converter 135A generating CAP files 140 with short tags substituted for long symbol names of package 130. Also, the converter 135A excludes from CAP files 140 certain export information that is not essential to execution on the card 152. The remaining information that is left in the CAP files 140 is an essential "core." This binary core is capable of being processed by loader 145A to generate loadable, executable files 150 for executing on the card 152. Note that the library CAP files 140 may be pre-loaded on card 152, or optionally they may be provided to the secondary developer as optional distributed information 293 for the secondary developer to load on the card.

Also, Java card converter 135A generates (binary) export files 138, which is provided to a secondary developer responsible for the Java card applet 160. The export files 138 include the certain export information and are further described in the related application. They are also now specified by chapter 5 of Java Card Virtual Machine Specification version 2.1 (the "JCVM specification"). The JCVM specification is hereby incorporated herein by reference. It should be noted here, however, that an export file 138 contains linking information used for resolving interpackage references on the card and contains mapping from symbolic information to identifiers.

In the embodiment illustrated in FIG. 1, the library 150 will interface with Java Card applet 190 on the card 152. (It should be understood that library 150 is just one example of files that provide services to other applications. An applet exporting interfaces is another example.)

Note that distributed information 192 provided to the secondary developer comprises the library source code 110 and the library export file 138. Since the library source code could contain some very sensitive information, distributing this code could pose unacceptable risks.

Figure 2:
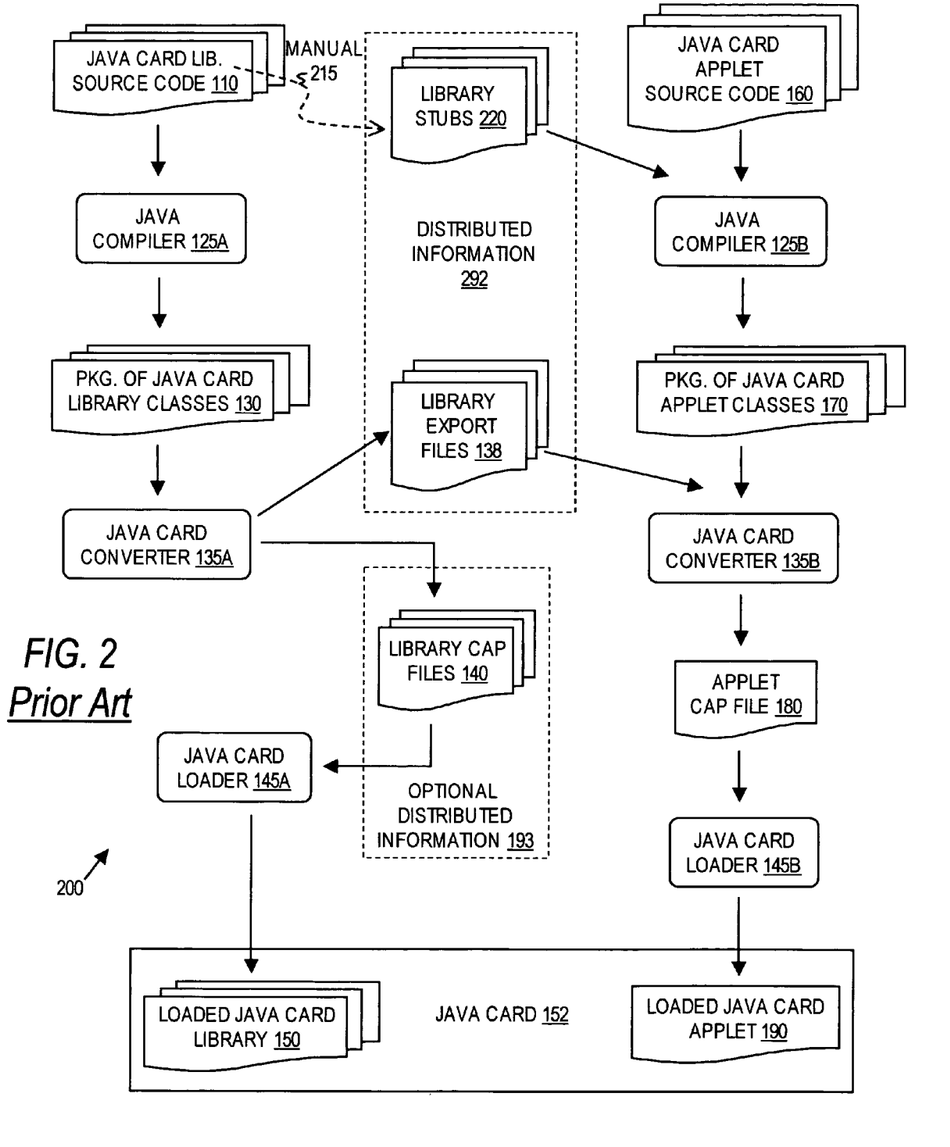
FIG. 2 illustrates further aspects of a Java Card application development process.

Referring now to FIG. 2, the issue of distributing the library source code 110 is addressed. Since distribution of this code could carry unacceptable risks, a set of library stubs 220 are derived manually 215 from Java Card library source code 110 and provided to the secondary developer, as part of distributed information 292. The library stubs 220 exclude the source code 110 executable statements, but includes declarations and interfaces of source code 110, so that the secondary developer can compile (binary) class files 170, for converting to CAP files 180, etc.

Referring now to the right hand side of FIG. 2, aspects of the development process 200 are shown which relate to developing the (binary) applet 190 by the secondary developer. The secondary developer compiles a package of Java Card applet classes 170 from the developer's own Java Card applet source code 160 and the primary developer's manually derived 215 library stubs 220. The secondary developer then uses the Java Card converter 135B to process the applet classes 170 and the export files 138 received from the primary developer. The export files 138 include an identifier mapping table of the previously mentioned symbol substitutions. The Java Card converter 135B resolves package 170 along with the symbol references in the export files 138 and generates the secondary developer's applet CAP file 180, which is then processed by loader 145B to generate loadable applet 190.

Development process 200 is set out in further detail in the above cross-referenced, related application. See also "A Simple(r) Interface Distribution Mechanism for Java Card," Ksheerabdhi Krishna and Michael Montgomery, Java on Smart Cards: Programming and Security, I. Attali, T. Jensen (Eds.), First International Workshop, Java Card 2000, Cannes, France, Sep. 14, 2000, Revised Papers, Springer-Verlag, LNCS 2041, p. 114 ff., which is hereby incorporated herein by reference.

Although using the library stubs 220 avoids the risks associated with distributing the Java card library source code 110, it introduces another set of problems. First, the manual derivation process 215 is time consuming and error prone. An improper deletion could render the stub 220 useless; too little deletion could leave sensitive information in the stub. Second, each time the library source code changes, this time consuming and error prone manual derivation 215 must be repeated. Third, a secondary developer receiving the distributed information 138 must take care to ensure that the library export files and library stubs are the correctly associated versions. An error here could cause the applet to fail. This is problem compounded if multiple versions of a library are distributed.

Figure 3:
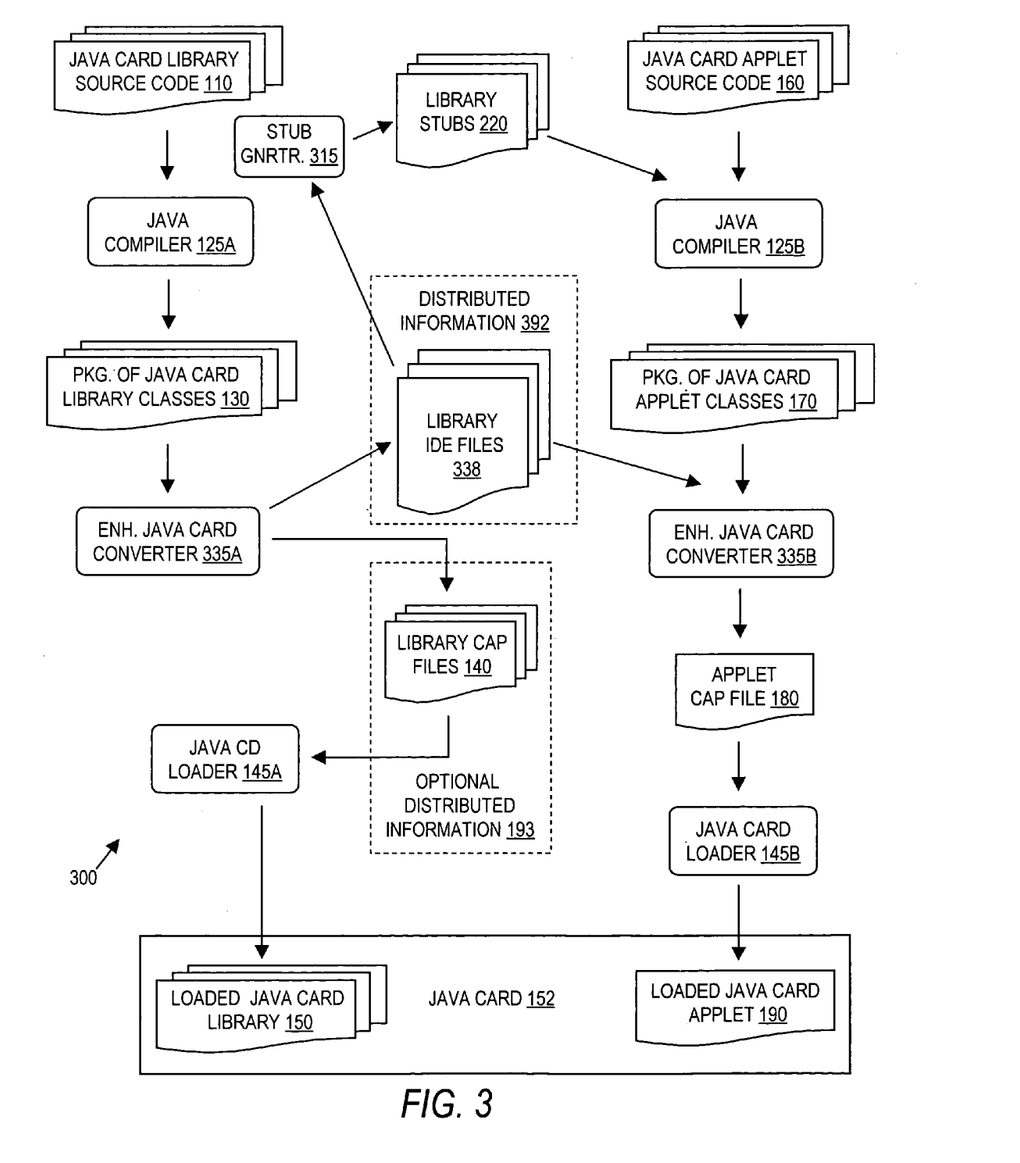
FIG. 3 illustrates aspects of a development process 300, according to an embodiment of the present invention.

Referring now to the left hand side of FIG. 3, aspects from the point of view of the primary developer are shown for a development process 300, according to an embodiment of the present invention. In this process, the primary developer writes source code 110 for a library that will ultimately be converted into a form suitable for running on a Java Card smart card 152, i.e., loaded library files 150. The source code 110 is used by Java compiler 125B to compile the applet source code 110 into a binary code package of classes 130. Then the package 130 is converted by an enhanced Java Card converter 335A to binary library CAP files 140, which are processed by loader 145A to generate loadable Java Card library 150.

Since the library 150 will provide services to another on-card application, information 392 must be distributed to secondary developers. For the specific library 110 and its corresponding package 130, CAP files 140, etc. the information 392 includes an interface definition and export file ("IDE" file) 338, which is generated by enhanced Java Card converter 335A processing the primary developer's package of binary Java Card library classes 130. Properties of the IDE file 338 will be further described below. But first, consider the development process 300 from the point of view of the secondary developers.

Referring now to the right hand side of FIG. 3, aspects of the development process 300 for developing an applet 190 are shown from the point of view of a secondary developer, according to an embodiment of the present invention. Although secondary developers still need the library stubs 220, in the present embodiment the stubs 220 are not distributed. Instead, a stub generator 315 is provided for synthesizing the stubs 220 from IDE files 338. This generator 315 may be included in the information 392 distributed to the secondary developer along with the IDE file 338, or it may be made more generally available, such as on a web site for downloading.

After generating the Java Card library stubs 220 from IDE file 338, the secondary developer processes the developer's own Java Card applet source code 160, and the library stubs 220 with Java compiler 125B to compile a package of Java Card applet classes 170. The developer processes the applet classes 170 and the IDE file 338 with the Java Card converter 335B to generate the secondary developer's applet CAP file 180, which are then processed by loader 145B to generate loadable Java Card applet 190.

As compared with the development process 200 of FIG. 2, the process 300 of FIG. 3 is advantageous because it mitigates the three problems discussed above. First, the stubs do not require a time consuming and error prone manual approach. They are automatically generated without error. Second, if the library code changes, the stubs can be automatically generated after each change, instead of having to manually generate stubs after each change. Third, the potential problem that arises for mismatched versions of library stubs and export files is avoided. The secondary developer can regenerate the library stubs 220 from IDE files 338 just before each compilation to ensure that the correction version of the library stubs 220 is used.

Figure 4:
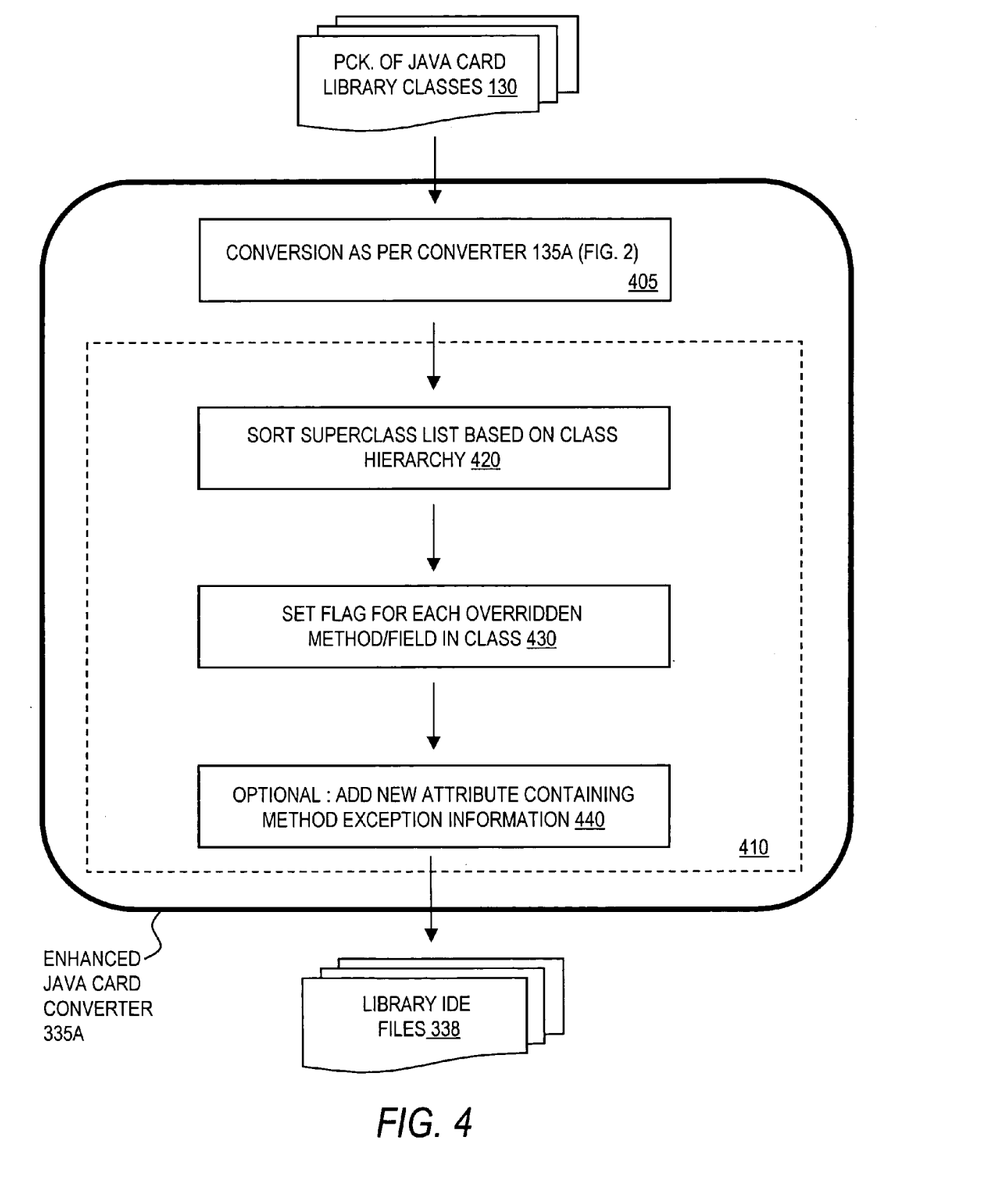
FIG. 4 illustrates additional aspects of a Java Card converter 335A, according to an embodiment of the present invention.
Figure 5A:
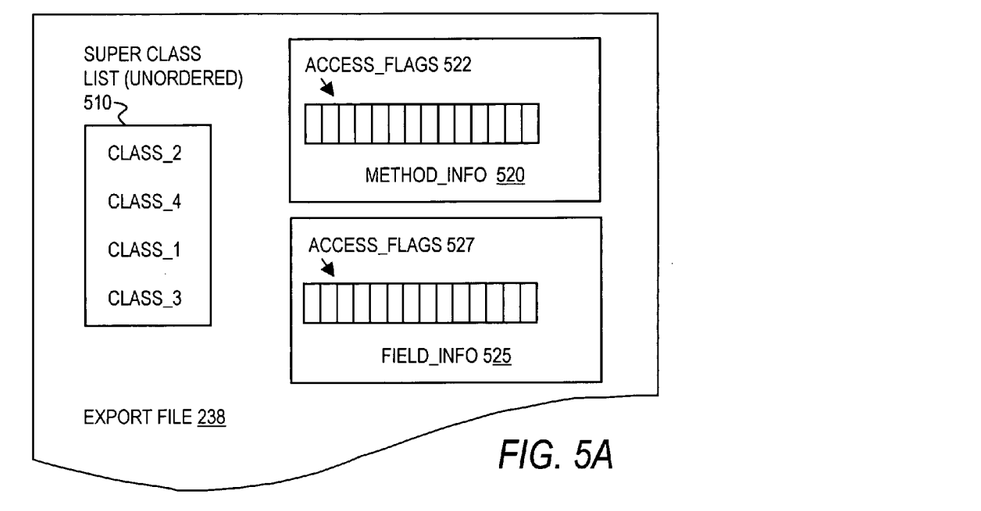
FIG. 5A illustrates certain aspects of an export file 138, according to aspects of the embodiment of FIG. 1
Figure 5B:
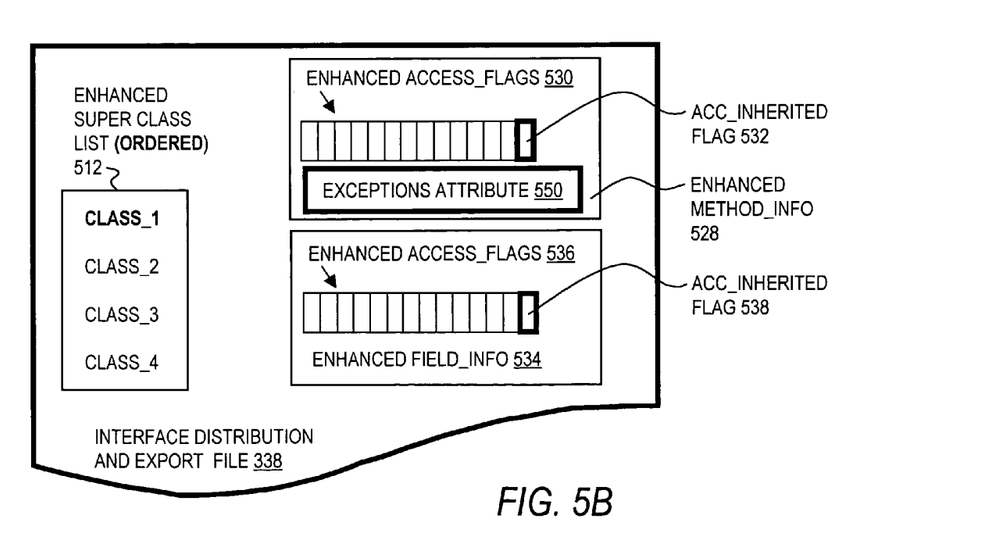
FIG. 5B illustrates certain aspects of an interface definition and export file 338, according to aspects of the embodiment of FIG. 3.

Referring now to FIG. 4 additional aspects of a Java Card converter 335A are illustrated in the form of a flow chart, according to an embodiment of the present invention. At step 405 the package of Java Card library classes 130 is converted, as has been previously disclosed in the related, cross referenced application concerning the converter 135A of FIG. 2. Additional conversion steps 410 are included for the enhanced converter 335A. These steps 410 include step 420, sorting the super class list based on class hierarchy, and step 430, setting a flag for each overridden method and field of each class. An optional step 440 may also be included, according to which a new exception attribute is added for each method. Responsive to performing the steps 405 through 440 for all the methods and fields of the package 130 a resulting set of IDE files 338 is generated. These steps will be more clearly understood with reference to FIG's 5A and 5B following.

Referring now to FIG. 5A, certain aspects of an export file 138 are illustrated, according to aspects of the embodiment of FIG. 2. The export file 138 includes a list 510 of all super classes in the "class_info" structure defined in the JCVM specification. The list 510 is in an unspecified order. The export file 138 also has an instance of method_info and field_info structures 520 and 525 respectively for each method and field. Each structure 520 and 525 includes respective access_flags 522 and 527.

Referring now to FIG. 5B, certain aspects of the IDE file 338 are illustrated, according to aspects of the embodiment of FIG. 3. To provide the IDE file 338, the export file 138 (FIG. 1) is augmented with additional information, which includes information regarding immediate super classes, overwritten methods and fields, and exceptions. Since only non-private method signatures and field signatures are needed for off-card compiling and conversion, and since the IDE file 338 has a binary version of the declarations and fields of the source code Java Card applet 210, the IDE file 338 with the addition of the information is sufficient for synthesizing the library stubs 220 (FIG. 3).

It is necessary to include additional super class information in the IDE file 338 for each class of library 110 (FIG. 2) because the immediate super class of a class cannot otherwise be determined from the export file 138. By modifying the unordered list 510 of "class_info" super classes to an ordered list 512 and including the ordered list 512 in the modified IDE file 338, the immediate super class of a class can be determined from the modified IDE file 338 without any additional overhead as compared to the export file 138. It is sufficient to include only immediate super class information for each class of an applet because Java has a single inheritance model.

Supplemental information about overwritten methods and fields includes respective flags ACC_INHERITED 532 and 538. The reasons for this are as follows. The export file 138 for a package of Java Card library classes 130 (FIG. 2) includes not only the explicitly defined methods of the classes 130, but also all the methods from the super classes and super interfaces for the classes 130, since all of these methods are inherited. Thus, although the super class itself is not explicitly exported, it's methods "show through " in the export file 138. On the other hand, however, a class in the package of classes 130 may override any of these methods. Therefore, unless supplemental information about overwritten methods and fields is included with the IDE file 338, the stub generator 315 (FIG. 3) will not be able to determine which methods and fields are overwritten, if any.

Since space is available in access_flags 522 and 527 of export file 138, the IDE file 338 incorporates ACC_INHERITED flags 532 and 538 into the available space. The IDE file 338 is shown in FIG. 5 with its modified method_info structure 528 and the modified field_info structure 534 that have access flags 530 and 536 including respective ACC_INHERITED flags 532 and 538. If such a flag is set, this indicates that the corresponding method or field was inherited and not overridden by the subject class. Since space is already available for this, adding the flags 532 and 538 does not add overhead as compared to export file 138.

Exception information is added as an exceptions attribute 550 for each method, as part of the method_info 528 structure of the modified IDE file 338. Exception information, if any, is not strictly required to make the library stubs 220. Nevertheless, including exception information improves the quality of the synthesized stubs 220. Attribute structure in general is defined in the JCVM specification. Refer to section 4.7.3 of the JCVM specification for details. The exceptions attribute 550 includes an exception index table that indicates exception type for each of the exceptions for a method. The structure of the exceptions attribute 550 in the IDE file 338 is the same as these other attribute structures, and is as follows:

Exceptions_attribute {
u2 attribute_name_index
u4 attribute_length
u2 number_of_exceptions
u2 exception_index_table [number of exceptions]
}

Figure 7A:
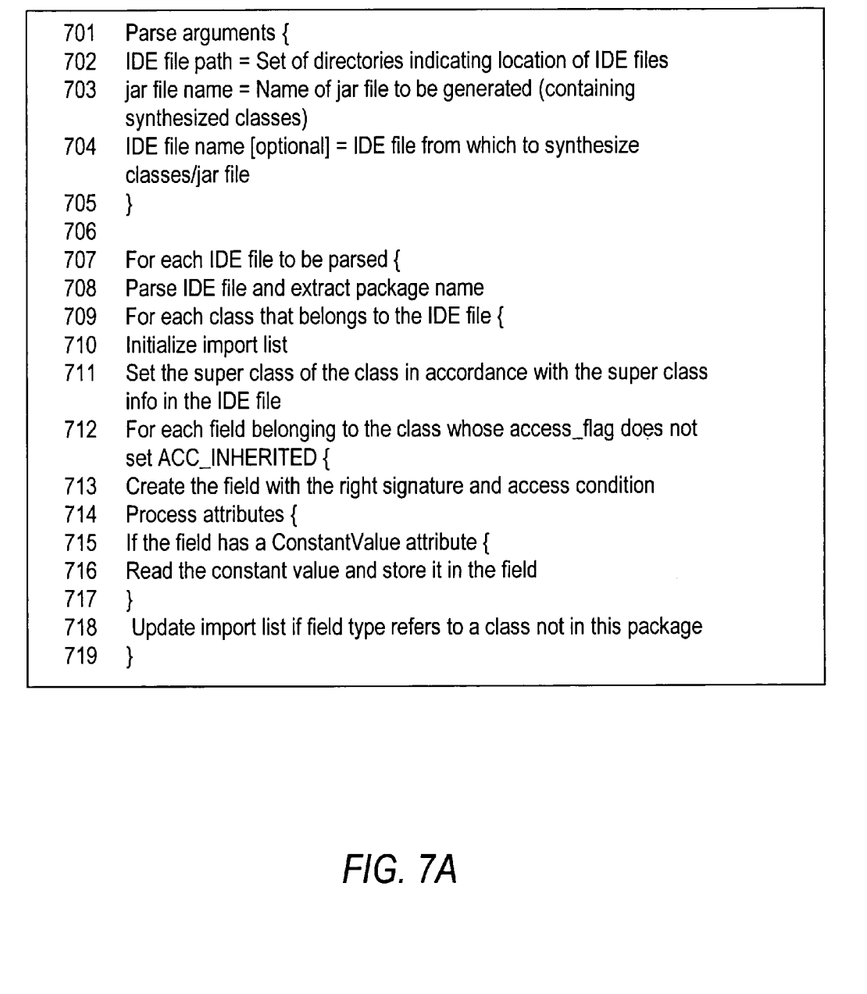
FIG. 7A illustrates a first portion of psuedo code for stub generator 315, according to an embodiment of the present invention.
Figure 7B:
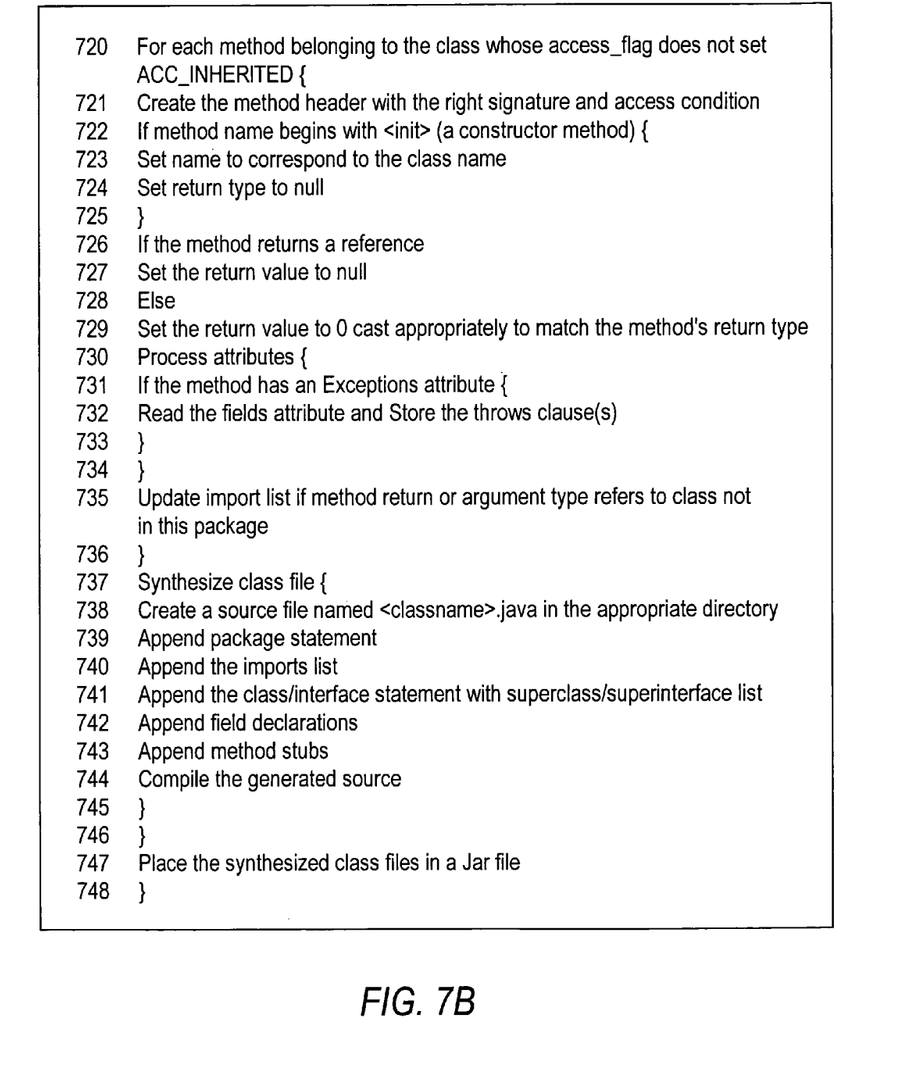
FIG. 7B illustrates a second portion of psuedo code for stub generator 315, according to an embodiment of the present invention.

FIGS. 7A and 7B set out pseudo code by which, as shown in FIG. 3, a stub generator 315 generates library stubs 220 from the IDE files 338. Lines 701 through 705 concern initialization steps relating to file naming, source and target paths, etc.

Figure 6:
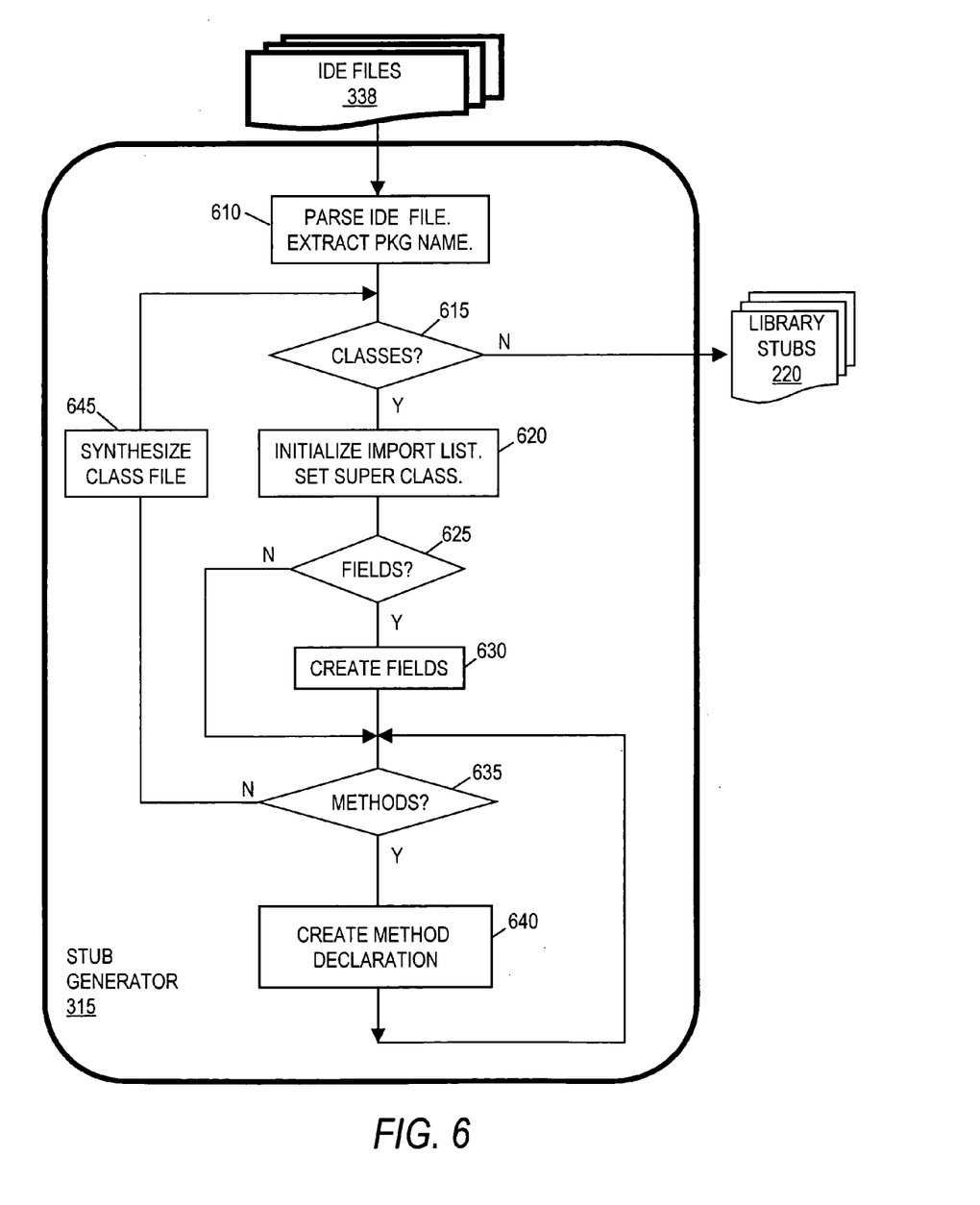
FIG. 6 illustrates additional aspects of a stub generator 315, according to aspects of the embodiment of FIG. 3.

Referring now to FIG. 6, aspects of the psuedo code of FIGS. 7A and 7B for the stub generator 315 are illustrated in the form of a flow chart. (It should be understood that the flow chart illustrates steps for synthesizing one library stub file 220, as shown in the psuedo code beginning at line 708 and ending at line 746 (FIG. 7A), and that the illustrated process is repeated for all subject files. Throughout the following description of the flow chart of FIG. 6, reference will be made to lines "7xx" of the pseudo code of FIGS. 7A and 7B.)

Beginning at step 610 (lines 707 through 708) an IDE file 338 is parsed and its package 130 (FIG. 3) name is extracted. Then, at step 615, a determination is made as to whether there any remaining classes to be processed that belong to the IDE file (line 707). If there are classes to be processed, then at step 620 an import list is initialized and a super class is set from the super class information 512 (FIG. 5) included in the IDE file 338. Next, at step 625, a determination is made as to whether there are any fields belonging to the class currently being processed that are not overridden (line 712). If there are not, then step 630 is skipped. If there are, then at step 630 a field is created for the library stub with the right signature and access condition, any constant value attributes are read and stored, and the import list is updated for any field type that refers to a class not in this package (lines 713 through 719).

Next, at step 635 a determination is made whether any methods remain to be processed for the class that are not overridden (line 720). If there are, then at step 640 a method declaration is created, which includes creating a method header with the right signature and access condition, setting the method name to correspond to the class name in a proper case, setting return type and return value, and creating information from the exceptions attribute (lines 721–734). Once all the methods have been processed, a class file is synthesized at step 645, which includes creating a source file in the appropriate directory and name and appending package statement, imports list, class/interface statement with superclass/super interface list, field declarations and method stubs (lines 737 through 745).

Figure 8:
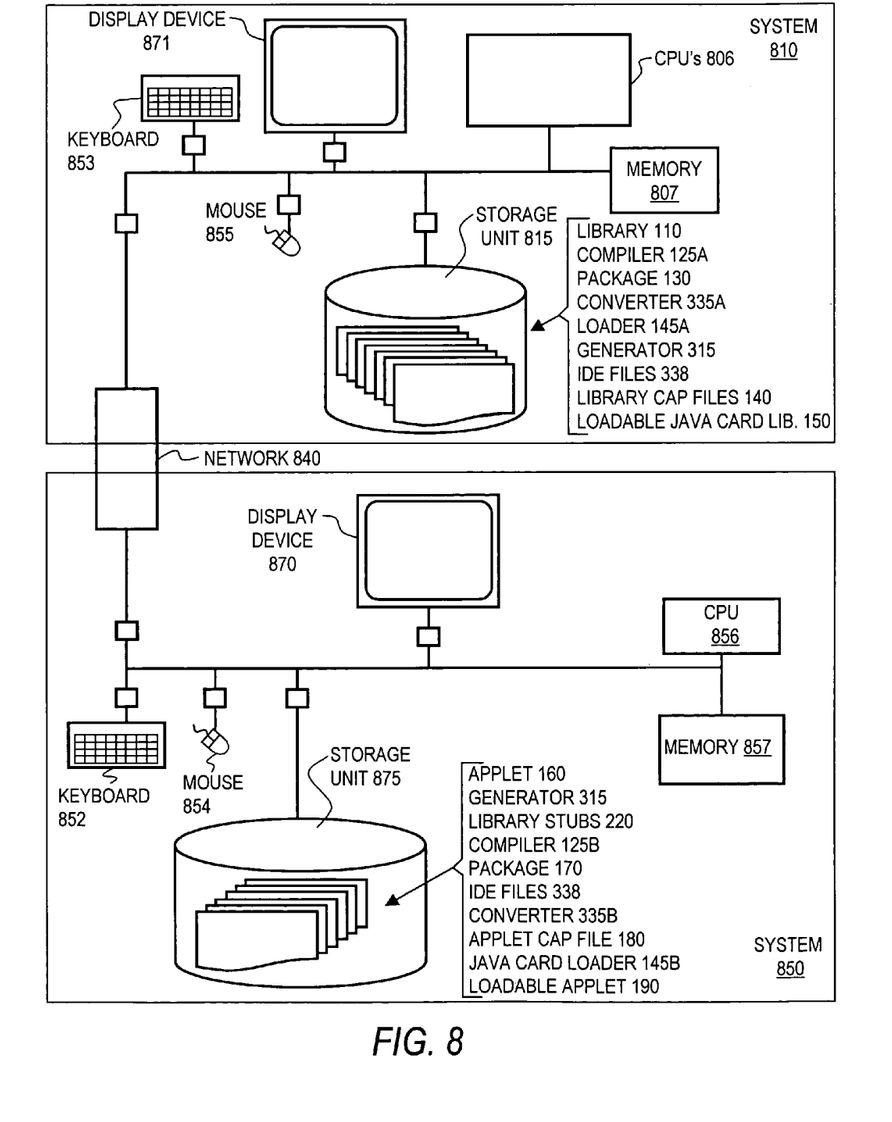
FIG. 8 illustrates a computer system, according to an embodiment of the present invention.

Referring now to FIG. 8, computer systems and network 800 are illustrated for an embodiment of the present invention. Computer system 810 is a computer system suitable for a primary developer. The system 810 has one or more central processors ("CPU's") 806 connected to a network 840, and including interface devices such as keyboard 853, mouse 855 and display device 871. The system 810 has a disk storage unit 815 and memory 807, such as random access memory, coupled to CPU's 806. The storage unit 815 is for storing programs and data, including library 110, compiler 125A, package 130, converter 335A, loader 145A, generator 315, library CAP files 140, loadable library 150, IDE files 338, etc. The programs, etc. are operable to be selectively moved from the storage unit 815 to memory 807 for execution by the CPU's 806, thereby causing the system 810 to perform operations as described herein above.

The computer system 850 is suitable for a secondary developer. The system 850 has a CPU 856 connected to the network 840, and including interface devices such as keyboard 852, mouse 854 and display device 870. The system 850 has a disk storage unit 875 and memory 857, such as random access memory, coupled to CPU 856. The storage unit 875 is also for storing programs and data, including applet 160, generator 315, stubs 220, compiler 125B, package 170, IDE files 338, converter 335B, applet CAP file 180, loader 145B, loadable applet 190, etc. The programs, etc. are operable to be selectively moved from the storage unit 875 to memory 857 for execution by the CPU 856, thereby causing the system 850 to perform operations as described herein above. The network 840 permits programs and data to be distributed between the systems 810 and 850.

It should be understood that the secondary developer may obtain some of the items epicted for storage on storage unit 875 from the primary developer's system 810 and other items from other sources. For example, compiler 125B and loader 145B may be available to developers from sources other than the primary developer.

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

The description of the present embodiment has been presented for purposes of illustration, but is not intended to be exhaustive or to limit the invention to the form disclosed. Many additional aspects, modifications and variations are also contemplated. For example, the libraries and applets have been described as running on a Java Card; however, it should be understood that the invention should not be limited to programs for running on a Java Card. The invention is applicable to computing systems in general. The invention is particularly well suited for resource constrained systems, of which a Java Card is merely one particular example. Likewise, IDE files have been described for Java Card applets, but it should be understood that in another embodiment the files are more generally applied. That is, in another embodiment the IDE files provide export information and specify interface definition files for some other application, in which case the IDE files describe interfaces to functions or methods of a non-Java Card program module that other modules will link against. Moreover, the IDE files may be ASCI text or binary, according to some predetermined format.

To consider general applications of this invention, there are many cases for various computing systems such as personal computers and workstations where library files are distributed so that a secondary development can link against those libraries. To avoid the aforementioned risks of distributed source code, in most cases the libraries are distributed in binary form. However, there are some excellent decompilers that can recreate the source code; in some cases the resulting source code is better structured and more understandable than the original version. So compiling is not adequate protection. To help with the problem, tools were created which can take binary code and obfuscate the code before distribution. The resulting source code resulting from decompiling the obfuscated code is much harder to understand, yet the secrets are still there for those diligent or motivated enough to parse the obfuscated code. In an embodiment applicable to these cases, information is generated in a format containing only information needed to synthesize the stubs, and this information is distributed. In a related, alternative embodiment, the library developer creates the information in the distribution format, synthesizes stubs himself, then distributes the synthesized stubs. Although this saves a step for the secondary developer, it generally results in a larger distribution, since the distribution information is otherwise typically much smaller than the synthesized stubs.

Prior to the present invention, Interface Definition Language files ("IDL" files) were another attempt to solve this problem. By distributing the IDL files and supplying stub generators, the IDL files eliminated the need to distribute source code. Although the IDL files do an effective job at suppressing sensitive information, the IDL files must be generated by hand and are therefore subject to the problems mentioned with hand generated files above. By carefully examining the IDE file format of the above described embodiment it should be appreciated that the described modifications to export files enable the resulting IDE files to provide an interface definition as provided by IDL files. That is, the modifications supply missing information needed for stub generation. However, the IDE files resulting from modifying export files contain more information than strictly needed for IDL files, since the IDE files also contain information required for linking, etc. In one embodiment of this invention, IDL files are automatically generated in various formats from the source code, in a manner similar to how IDE files are generated in the preferred embodiment. This is advantageous because existing tools associated with various IDL formats can be used, while the time consuming and error prone step of manually generating IDL files is eliminated.

Element numbers and names of the elements herein do not necessarily have significance other than as a means of identification. Accordingly, an element name should not be considered as limiting the function of an element to solely the function implied by the name. For example, the converters described in the embodiment herein above may be referred to as "linkers" in another embodiment.

What is claimed is:

1. A method for creating interface information for interfacing a smart card library to a smart card software program, the method comprising the steps of:
   a) generating, by a converter processing a smart card library source code program, an augmented export file having token assignments required by an on-card linker and information useful to generate an interface definition for the smart card library; and
   b) operating an interface generator for generating a library interface source code file for the smart card library from the augmented export file, suitable for input to a compiler, so that source code for the smart card software program may be compiled from the library interface source code file and the source code for the smart card software program.

2. The method of claim 1, wherein step a) comprises generating export information for the augmented export file and the method comprises the step of:
   operating a converter to generate an executable version of the smart card software program responsive to processing the certain file and the compiled second software program.

3. The method of claim 1, wherein the smart card library source code program has classes and the information useful to generate an interface definition includes indications of immediate super classes for respective ones of the classes.

4. The method of claim 3, wherein the immediate super class for a class is indicated in an ordered list of classes.

5. The method of claim 1, wherein the smart card library source code program has classes and step a) comprises generating export information for the augmented export file including a list of super classes of the classes, and wherein the information useful to generate an interface definition includes immediate super class indications, the immediate super class indications being provided by an ordering of the list of super classes.

6. The method of claim 1, wherein the smart card library source code program has methods and the information useful to generate an interface definition includes indications of whether any of the methods are overridden.

7. The method of claim 6, wherein the indications of whether any of the methods that are overridden include respective flags.

8. The method of claim 1, wherein the smart card library source code program has methods and step a) comprises generating export information for the augmented export file including a certain set of access flags, and wherein information usefUl to generate the interface definition has indications of whether respective ones of the methods are overridden included as respective flags in the certain set.

9. The method of claim 1, wherein the smart card library source code program has fields, and the information usefUl to generate an interface definition includes an indication of whether any of the fields are overridden.

10. The method of claim 9, wherein the indications of whether any of the fields that are overridden include respective flags.

11. The method of claim 1, wherein the smart card library source code has fields and step a) comprises generating export information for the augmented export file including a certain set of access flags, and wherein the information useful to generate an interface definition has indications of whether respective fields that are overridden included as respective flags in the certain set.

12. The method of claim 1, wherein the information useful to generate an interface definition includes indications of types of exceptions.

13. A method for generating an augmented export file having information useful to generate interface definitions suitable for input to a compiler and export information for a smart card library source code program for linking with a smart card software program thereby producing a software program for loading onto a smart card wherein the export information includes information required to link the smart card library source code program and the smart card software program for execution on a smart card, the method comprising the steps of:
   a) generating, by a converter processing a smart card library source code the export file having token assignments required by an on-card linker and information useful to generate an interface definition for the smart card library source code including: ordering a list of classes of the smart card library source code and appending that ordered list to the export information contained in the export file to provide an indication of an immediate super class of the classes, and
   b) operating an interface generator for generating an interface suitable for input to a compiler for the smart card library source code from the export file, so that smart card software program source code may be developed and the smart card program may be compiled from the interface generated for the smart card library source code and the source code for the smart card software program.

14. The method of claim 13, comprising the step of:
   adding first flags to a certain flag space of the export information, wherein the first flags indicate whether respective methods of the smart card library source code are overridden.

15. The method of claim 14, comprising the step of:
   adding second flags to a certain flag space of the export information, wherein the second flags indicate whether respective fields of the smart card library source code are overridden.

16. The method of claim 15, comprising the step of:
   adding indications of types of exceptions to the export information.

17. A computer program product stored in a computer storage media, the computer program being operable for distributing information for interfacing to a software program, the computer program product comprising:
   first instructions for directing a computerized device to generate, by a converter processing a smart card library source code, an augmented export file having token assignments required by an on-card linker and information useful to generate an interface definition for the smart card library source code suitable for input to a compiler; and
   second instructions for directing the computerized device to generate the interface definition for the smart card library from the augmented export file, so that a smart card software program source code may be developed and the smart card software program may be compiled from the interface definition generated for the smart card library source code and the source code for the smart card software program.

18. The computer program product of claim 17, wherein the computer program product comprises:

third instructions for directing the computerized device to generate an executable version of the smart card software program responsive to processing the augmented export file and the compiled second software program.

19. The computer program product of claim 17, wherein the smart card library source code has classes and the information useful to generate an interface definition includes indications of immediate super classes for respective ones of the classes.

20. The computer program product of claim 19, wherein the immediate super class for a class is indicated in an ordered list of super classes.

21. The computer program product of claim 17, wherein the card library source code is one or more library classes and the first instructions comprise instructions for generating export information for the augmented export file including a list of super classes of the classes, and wherein the information useful to generate an interface definition includes immediate super class indications, the immediate super class indications being provided by an ordering of the list of super classes.

22. The computer program product of claim 17, wherein the smart card library source code has methods and the information useful to generate an interface definition includes indications of whether any of the methods are overridden.

23. The computer program product of claim 22, wherein the indications of whether any of the methods are overridden include respective flags.

24. The computer program product of claim 17, wherein the smart card library source code has methods and the first instructions comprise instructions for generating export information for the augmented export file including a certain set of access flags, and wherein the information useful to generate an interface definition has indications of whether respective ones of the methods are overridden included as respective flags in the certain set.

25. The computer program product of claim 17, wherein the smart card library source code has fields, and the information useful to generate interface definition includes an indication of whether any of the fields are overridden.

26. The computer program product of claim 25, wherein the indications of whether any of the fields that are overridden include respective flags.

27. The computer program product of claim 17, wherein the smart card library source code has fields and the first instructions comprise instructions for generating export information for the augmented export file including a certain set of access flags, and wherein the information useful to generate an interface definition has indications of whether respective ones of the fields are overridden included as respective flags in the certain set.

28. The computer program product of claim 17, wherein the information useful to generate an interface definition includes indications of types of exceptions.

29. A computer program product stored in a computer storage media, the computer program being operable for generating an augmented export file having information useful for generating an interface definition suitable for input to a compiler and export information for a smart card library source code for linking with a smart card software program thereby producing a software program for loading onto a smart card wherein the export information includes information required to link the smart card library and the smart card software program for execution on a smart card, the computer program product comprising:

first instructions directing a computerized device to generate, by a converter processing a smart card library source code, an augmented export file having token assignments required by an on-card linker and information useful to generate an interface definition for the first smart card software program, including: instructions to order a list of classes appended to the export information contained in the export file, to provide an indication of super classes of the classes; and interface generator instructions for causing the computerized device to generate an interface, suitable for input to a compiles for the smart card library source code from the augmented export file, so that smart card software program source code may be developed and the smart card software program may be compiled from the interface generated for the smart card library source code and the source code for the smart card software program.

30. The computer program product of claim 29 comprising:

second instructions for adding first flags to a certain flag space of the export information, wherein the first flags indicate whether respective methods of the first software program are overridden.

31. The computer program product of claim 30 comprising:

third instructions for adding second flags to a certain flag space of the export information, wherein the second flags indicate whether respective fields of the first software program are overridden.

32. The computer program product of claim 31 comprising:

fourth instructions for adding indications of types of exceptions to the export information.

33. An apparatus comprising:

a processor;

a memory coupled to the processor for storing instructions for controlling the processor, wherein the processor is operative with the instructions to perform the steps of:

a) generating, by a converter processing a smart card library source code, an augmented export file having token assignments required by an on-card linker and information useful to generate an interface definition for a smart card library; and b) operating an interface generator for generating an interface, suitable for input to a compiler, for the smart card library source code from the augmented export file, so that smart card software program source code may be developed and the smart card software program may be compiled from the interface generated for the smart card library source code and the source code for the smart card software program.

34. The apparatus of claim 33, wherein step a) comprises generating export information for the certain file, and the processor is operative with the instructions to perform the step of:

operating a converter to generate an executable version of the smart card software program responsive to processing the interface definition and augmented export file and the compiled smart card software program.

35. The apparatus of claim 33, wherein the smart card library source code has classes and the information useful to generate an interface definition includes indications of immediate super classes for respective ones of the classes.

36. The apparatus of claim 35, wherein the immediate super class for a class is indicated in an ordered list of classes.

37. The apparatus of claim 33, wherein the smart card library source code has classes and step a) comprises generating export information for the augmented export file including a list of super classes of the classes, and wherein the information useful to generate an interface definition has immediate super class indications, the immediate super class indications being provided by an ordering of the list of super classes.

38. The apparatus of claim 33, wherein the smart card library source code has methods and the information useful to generate interface definition includes indications of whether any of the methods are overridden.

39. The apparatus of claim 38, wherein the indications of whether any of the methods that are overridden include respective flags.

40. The apparatus of claim 33, wherein the smart card library source code has methods and step a) comprises wherein the export information for the augmented export file includes a certain set of access flags, and wherein the information useful to generate an interface definition has indications of whether respective ones of the methods are overridden included as respective flags in the certain set.

41. The apparatus of claim 33, wherein the smart card library source code has fields, and the information useful to generate an interface definition includes an indication of whether ones of the fields are overridden.

42. The apparatus of claim 41, wherein the indications of whether ones of the fields are overridden include respective flags.

43. The apparatus of claim 33, wherein the smart card library source code has fields and step a) comprises wherein the export information for the certain file includes a certain set of access flags, and wherein the information useful to generate an interface definition has indications of whether respective ones of the fields that are overridden included as respective flags included in the certain set.

44. The apparatus of claim 33, wherein the information useful to generate an interface definition includes indications of types of exceptions.

45. An apparatus for generating an export file having information useful to generate an interface definition suitable for input to a compiler and export information for a smart card software program, the apparatus comprising:
a processor;
a memory coupled to the processor for storing instructions for controlling the processor, wherein the processor is operative with the instructions to perform the step of:
a) generating, by a converter processing a smart card library, an augmented export file having token assignments required by an on-card linker and information useful to generate an interface definition for the smart card library, including: ordering a list of classes included in the export information contained in an export file, to provide an indication of an immediate super class; and
b) operating an interface generator for generating an interface suitable for input to a compiler for the smart card library from the augmented export file, so that source code may be developed for a smart card program may be compiled from the interface generated for the smart card library and the source code for the smart card program.

46. The apparatus of claim 45, wherein the processor is operative with the instructions to perform the step of:
adding first flags to a certain flag space of the export information, wherein the first flags indicate whether respective methods of the smart card library are overridden.

47. The apparatus of claim 46, wherein the processor is operative with the instructions to perform the step of:
adding second flags to a certain flag space of the export information, wherein the second flags indicate whether respective fields of the smart card library are overridden.

48. The apparatus of claim 47, wherein the processor is operative with the instructions to perform the step of:
adding indications of types of exceptions to the export information.

* * * * *